(12) United States Patent
Liu

(10) Patent No.: US 8,732,114 B2
(45) Date of Patent: May 20, 2014

(54) KNOWLEDGE RE-USE FOR CALL ROUTING

(75) Inventor: Ding Liu, Rochester, NY (US)

(73) Assignee: Nuance Communications, Inc., Burlington, MA (US)

( * ) Notice: Subject to any disclaimer, the term of this patent is extended or adjusted under 35 U.S.C. 154(b) by 1019 days.

(21) Appl. No.: 12/422,671

(22) Filed: Apr. 13, 2009

(65) Prior Publication Data

US 2009/0259613 A1 Oct. 15, 2009

Related U.S. Application Data

(60) Provisional application No. 61/044,704, filed on Apr. 14, 2008.

(51) Int. Cl.
*G06F 17/00* (2006.01)
*G06N 7/00* (2006.01)
*G06N 7/08* (2006.01)
*G10L 15/18* (2013.01)
*G06N 99/00* (2010.01)
*G06F 17/27* (2006.01)

(52) U.S. Cl.
CPC ......... *G10L 15/1815* (2013.01); *G06N 99/005* (2013.01); *G06F 17/2785* (2013.01)
USPC .............................. 706/55; 704/275; 704/257

(58) Field of Classification Search
CPC .............. G10L 15/1815; G06N 99/005; G06F 17/2785; G06F 17/30731
USPC .................................. 706/55; 704/9, 257, 275
See application file for complete search history.

(56) References Cited

U.S. PATENT DOCUMENTS

| | | | |
|---|---|---|---|
| 6,035,039 A | 3/2000 | Tisdale et al. | 380/23 |
| 6,796,492 B1 | 9/2004 | Gatto | 235/379 |
| 7,197,460 B1 * | 3/2007 | Gupta et al. | 704/275 |
| 7,451,084 B2 | 11/2008 | Funakura | 704/235 |
| 7,519,558 B2 | 4/2009 | Ballard et al. | 705/50 |
| 7,624,007 B2 | 11/2009 | Bennett | 704/9 |
| 7,647,225 B2 | 1/2010 | Bennett et al. | 704/251 |
| 7,657,424 B2 | 2/2010 | Bennett | 704/9 |
| 7,698,131 B2 | 4/2010 | Bennett | 704/215 |
| 7,702,508 B2 | 4/2010 | Bennett | 704/257 |
| 7,725,307 B2 | 5/2010 | Bennett | 704/9 |
| 7,725,320 B2 | 5/2010 | Bennett | 704/255 |
| 7,729,902 B1 * | 6/2010 | Gupta et al. | 704/9 |
| 7,729,904 B2 | 6/2010 | Bennett | 704/215 |
| 7,831,426 B2 | 11/2010 | Bennett | 704/252 |
| 7,853,451 B1 * | 12/2010 | Gupta et al. | 704/257 |
| 7,869,998 B1 | 1/2011 | Di Fabbrizio et al. | 704/251 |
| 7,873,519 B2 | 1/2011 | Bennett | 704/257 |
| 7,912,702 B2 | 3/2011 | Bennett | 704/9 |
| 2003/0130849 A1 * | 7/2003 | Durston et al. | 704/270 |

(Continued)

OTHER PUBLICATIONS

Di Fabbrizio, G. et al. "AT&t help desk." In Interspeech. Sep. 2002. 4 pages.*

*Primary Examiner* — Alan Chen
*Assistant Examiner* — Benjamin Buss
(74) *Attorney, Agent, or Firm* — Sunstein Kann Murphy & Timbers LLP

(57) ABSTRACT

A method is described for semantic classification in human-machine dialog applications, for example, call routing. Utterances in a new training corpus of a new semantic classification application are tagged using a pre-existing semantic classifier and associated pre-existing classification tags trained for an earlier semantic classification application.

27 Claims, 5 Drawing Sheets

(56) References Cited

U.S. PATENT DOCUMENTS

| | | |
|---|---|---|
| 2005/0165607 A1* | 7/2005 | Di Fabbrizio et al. ........ 704/256 |
| 2005/0278164 A1* | 12/2005 | Hudson et al. .................... 704/4 |
| 2006/0149553 A1* | 7/2006 | Begeja et al. ................. 704/275 |
| 2007/0078643 A1* | 4/2007 | Sedogbo et al. .................. 704/9 |
| 2007/0208579 A1* | 9/2007 | Peterson ........................... 705/1 |
| 2007/0233488 A1* | 10/2007 | Carus et al. .................... 704/257 |
| 2008/0071533 A1* | 3/2008 | Cave et al. ..................... 704/235 |
| 2008/0270135 A1* | 10/2008 | Goel et al. ..................... 704/257 |
| 2009/0055184 A1* | 2/2009 | Hebert ........................... 704/257 |
| 2010/0145710 A1* | 6/2010 | Tremblay ...................... 704/275 |

* cited by examiner

KNOWLEDGE RE-USE FOR CALL ROUTING

This application claims priority from U.S. Provisional Patent Application 61/044,704, filed Apr. 14, 2008, the contents of which are incorporated herein by reference.

FIELD OF THE INVENTION

The present invention relates to call routing in human-machine dialogue computer applications.

BACKGROUND ART

Spoken language understanding systems have been deployed in numerous applications which require some sort of interaction between humans and machines. Most of the time, the interaction is controlled by the machine which asks questions of the users and then attempts to identify the intended meaning from their answers (expressed in natural language) and take actions in response to these extracted meanings.

One important class of applications employs Natural Language Understanding (NLU) technology for a type of semantic classification known as "call routing," whose goal is to semantically classify a telephone query from a customer to route it to the appropriate set of service agents based on a brief spoken description of the customer's reason for the call. Call routing systems reduce queue time and call duration, thereby saving money and improving customer satisfaction by promptly connecting the customer to the right service representative in large call centers.

Call routing applications classify spoken inputs into a small set of categories for a particular application. Spoken inputs such as "I have a problem with my bill," "Check my balance," "Did you get my payment?" might all be mapped to a "Billing" category. Since people express these requests in many different ways, call routers are typically implemented as a statistical classifier which is trained on a labeled corpus—that is, a set of spoken requests and their classifications.

Determining a semantic classification for a human utterance in a call routing system is typically a five-step process as illustrated by FIG. 1. Input speech from the caller is translated into a text string by an Automated Speech Recognition (ASR) Module 101. The ASR text is output into an NLU semantic classification component known as a Statistical Router 102. The Statistical Router 102 models the NLU task as a statistical classification problem in which the ASR text corresponding to an utterance is assigned to one or more of a set of predefined user intents, referred to as "call routes." Various specific classifiers have been compared in the literature with similar performance (1-2% differences in classification accuracy), including, for example, Boosting, Maximum Entropy (ME), and Support Vector Machines (SVM). For example, Statistical Router 102 may use binary unigram features and a standard back-propagation neural network as a classifier.

Typically, to create a new call routing application, a new training corpus must initially be developed based on the specific needs of the new application. FIG. 2 shows this process generally. A training corpus 201 contains examples of sample training utterances 202 which are labeled with associated router classification tags 203. A feature set in the training corpus 201 is selected (e.g., words in the sample training utterances 202) which together with a classification model 205 (e.g., neural network) is used to build and train a call routing classifier 204 for the application. This is an expensive process because a large labeled training corpus 201 must be collected and developed for each new application. After training of the call routing classifier 204 on the training corpus 201, it can be implemented in the application to process live unlabeled incoming utterances from real users of the on-line application.

Different applications have different call routing classifiers based on their own specific needs. There is usually no simple many-to-one or one-to-many mapping from routers of one application to another. In the machine learning community, the most common way of reusing knowledge is to induce a bias for the concerned model based on the existing data, with the assumption that the "inductive bias" would also work for the new data. This assumption is often not true when the existing and new data are in different applications and domains.

A framework taking the joint outputs of different classifiers and mapping them to the desired output was described by K. D. Bollacker and J. Ghosh, *A Scalable Method For Classifier Knowledge Reuse*, in Proceedings of the 1997 International Conference on Neural Networks, pp. 1474-79, June 1997, which is hereby incorporated by reference. But such method is very difficult to scale due to the exponential growth of the number of joint outputs when adding in more classifiers.

Karahan et al., *Combining Classifiers for Spoken Language Understanding*, Proceedings of ASRU-2003, 8th Biannual IEEE workshop on Automatic Speech Recognition and Understanding (ASRU '03), U.S. Virgin Islands, Nov. 30-Dec. 3, 2003, the contents of which are incorporated by reference, described combining different classifiers scores in a final classifier combining low level features which share a single common set of meanings. This means that the sharing classifiers are trained on subsets of the same tagged training set, or with data sets that have the same set of tagged meanings. In essence, there is an injection of hard knowledge from one classifier to another in that all the classifiers are required to be trained with the same set of call routes.

SUMMARY OF THE INVENTION

Embodiments of the present invention are directed to systems and methods for semantic classification in human-machine dialog applications, for example, call routing. Utterances in a new training corpus of a new semantic classification application are tagged using a pre-existing semantic classifier and associated pre-existing classification tags trained for an earlier semantic classification application.

In further specific embodiments, the method further includes training the new semantic classifier on the new training corpus to produce a set of new classification tags for the new semantic classifier including a plurality of the pre-existing classification tags. An embodiment may also create a set of application-specific company-generic classification tags from the set of new classification tags.

In any of the above embodiments, the semantic classifier may specifically be a statistical classifier, for example, a call routing classifier. And the new semantic classification application and the earlier semantic classification application may be in different application domains, or in the same application domain.

Embodiments of the present invention also include a method of abstracting a semantic classifier by identifying application-specific features associated with a semantic classifier, and replacing the application-specific features with generic stem rules. Some embodiments may further use the semantic classifier and the generic stem rules to implement a new semantic classifier.

In such embodiments, the semantic classifiers may be in different application domains or in the same application domain. The classifiers may be statistical classifiers, for example, call routing classifiers.

Embodiments of the present invention also include a computer program product implemented in a computer readable storage medium for semantic classification in human-machine dialog applications according to any of the above.

DETAILED DESCRIPTION OF SPECIFIC EMBODIMENTS

Embodiments of the present invention use a pre-existing semantic classifier (such as a call routing classifier) and its associated classification tags to improve performance of a new semantic classification application (such as a call routing application). This can be thought of as a soft-mapping that reuses the knowledge embedded in the existing semantic classification application for one or more different new semantic classification applications. In some embodiments, the new semantic classification application may be in the same domain as the pre-existing call routing application. In other embodiments, the new semantic classification application may be in a different domain from the pre-existing semantic classification application.

Figure 1:
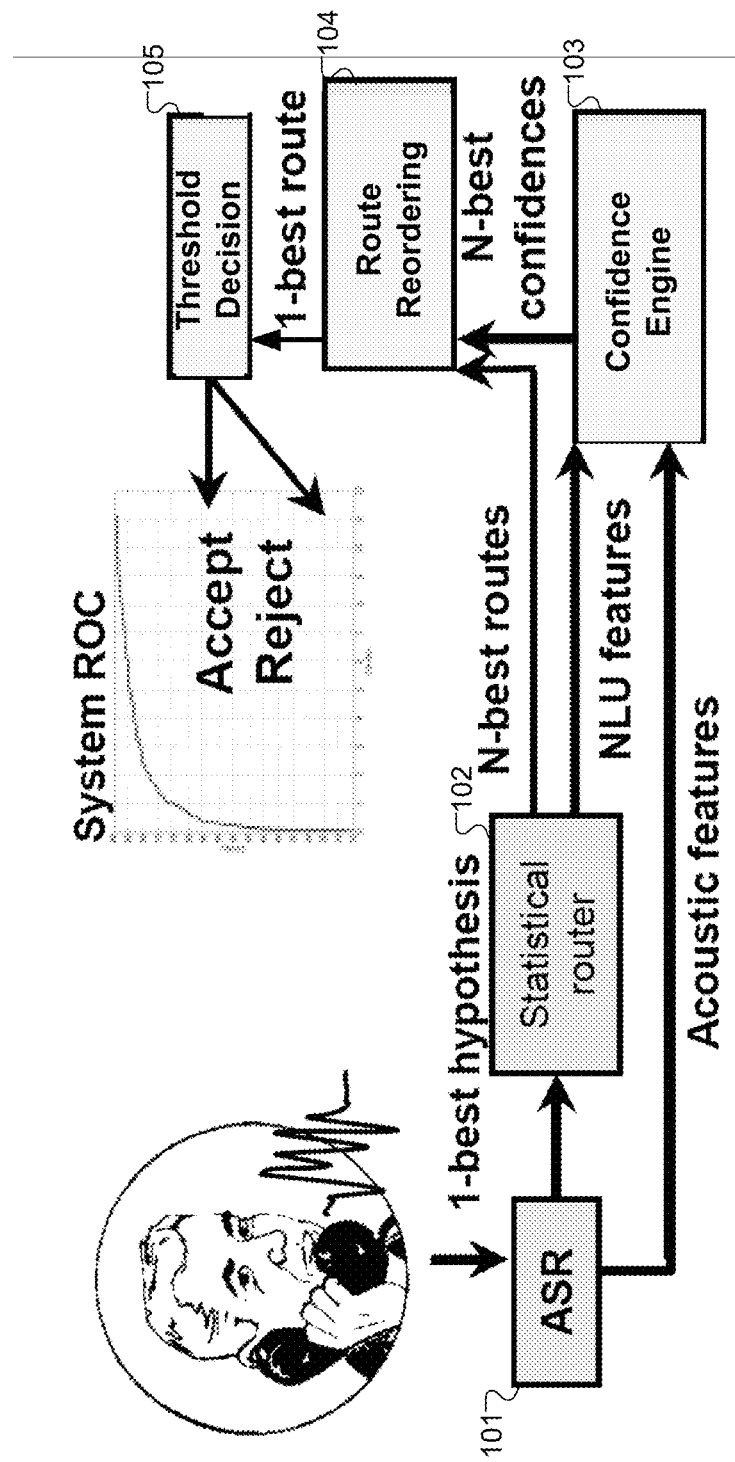
FIG. 1 shows various functional blocks in a typical semantic classification system in the specific form of a call router application.
Figure 2:
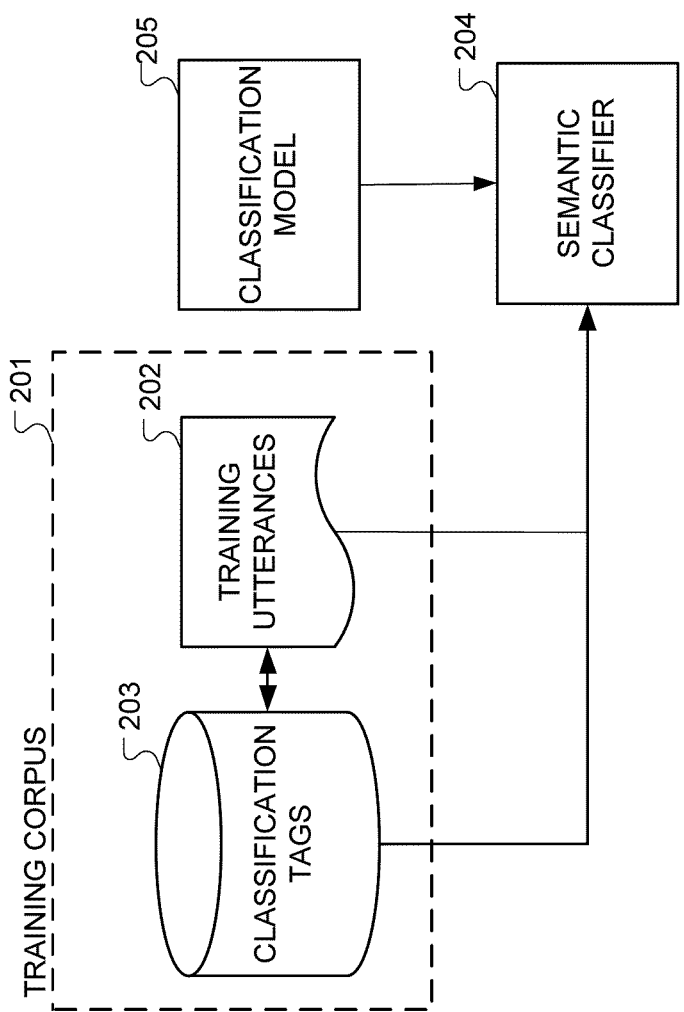
FIG. 2 shows an example of development of a new call routing classifier from a training corpus according to the prior art.
Figure 3:
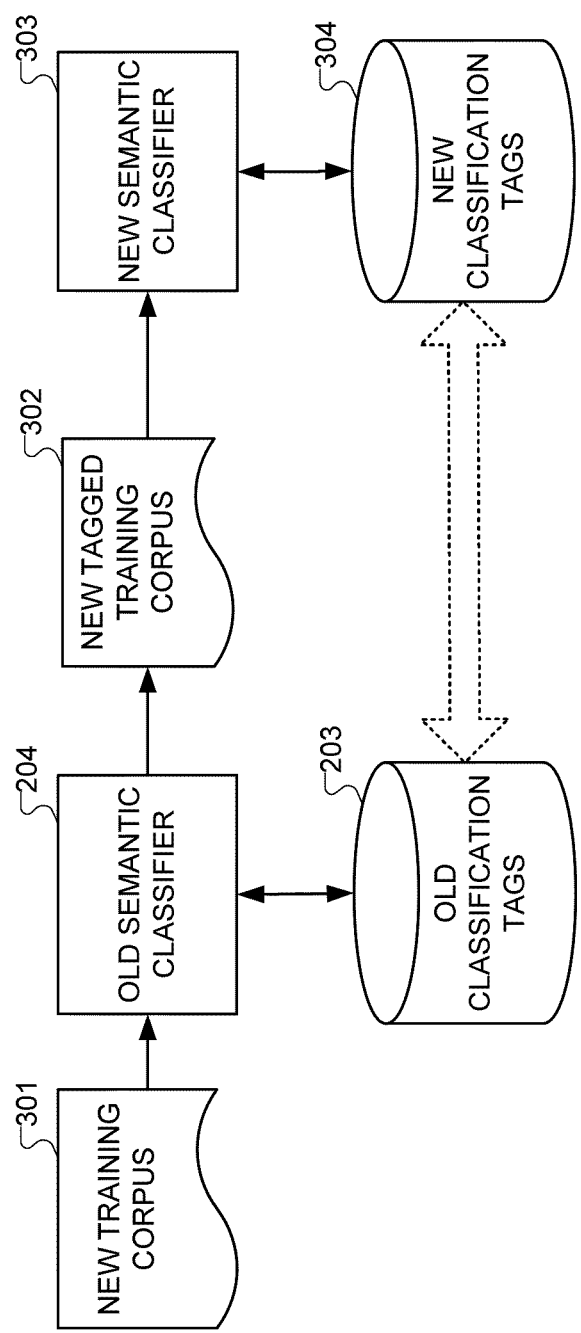
FIG. 3 shows the functional structure of one specific embodiment of the call routing invention.
Figure 4:
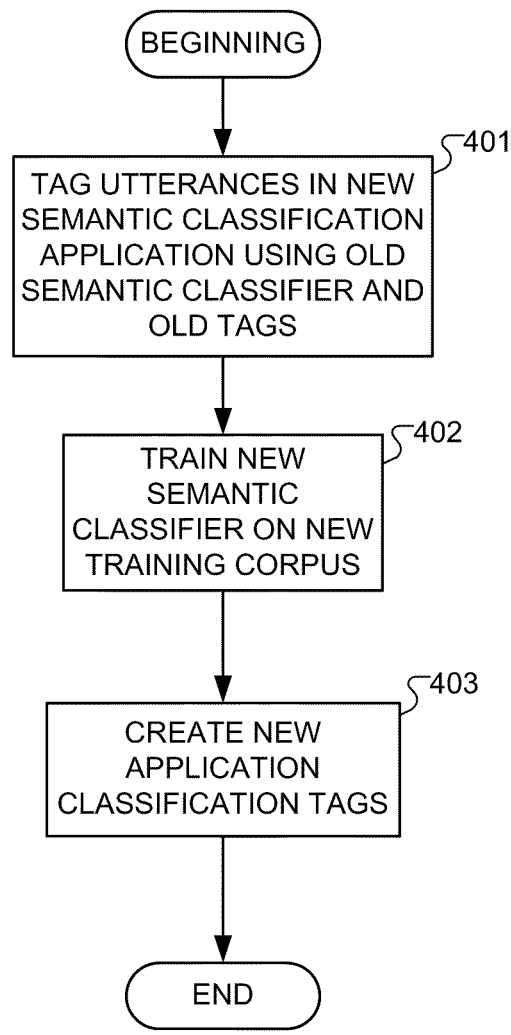
FIG. 4 shows various functional steps in developing a new semantic classification application according to an embodiment of the present invention.

FIG. 3 shows the functional structure of one specific embodiment, and FIG. 4 shows various functional steps involved in preparing a new semantic classifier from an old one. A new training corpus 301 for a new semantic classification application contains utterances that are classified and tagged by a pre-existing semantic classifier 204 from an earlier semantic classification application using its associated set of pre-existing classification tags 203, step 401. This produces a new tagged training corpus 302. The new semantic classifier 303 is then trained based on the processing of the utterances in the new training corpus 302, step 402. And the corresponding set of new application classification tags 304 are also created, step 403. In this way, the pre-existing classification tags 203 become features for the new classification tags 304 for the new semantic classification application and are trained together with whatever other features the new semantic classifier 303 develops.

For example, a pseudo code representation of one specific approach might be set forth as follows:

Process NewClassificationApplication
    tag utterances in new training corpus $U_n$ based on old classifier $C_o$
        and old tags $T_o$
    train new classifier $C_n$ on new training corpus $U_n$ to
        produce new application tags $T_n$ In this way, there is a soft mapping of knowledge from the old semantic classification application to the new one which is reflected in the new semantic classifier 303 and the new classification tags 304. One advantage of such an approach is that there is not the scaling problem as is present, for example, in Bollacker & Ghosh (1997) because each old classification tag 203 works as a feature in the new semantic classification tags 304 with the new semantic classifier 303 instead of using the joint classification tags 203 of the old semantic classifier 204 as a feature.

These classifier tag features can also be considered as a high level attribute feature for the new semantic classification application. For example, suppose there are pre-existing classifiers both for color and for shape. To make a new classifier for apples, the two earlier classifiers are used to tag the fruit with color and shape, and to train these two features with some apple samples. This leads to an idea that the apple usually has a round shape with red, yellow or green color. This also shows that a single old semantic classification application (e.g., color) doesn't necessarily have to have a clear mapping to the new semantic classification application (e.g., fruit). As long as the joint effect of all the old semantic classification applications helps to determinate the new semantic classification application, there will be a gain. In the worst case, if the classification tags of the old semantic classification applications are unrelated to the new semantic classification application (e.g., temper to fruit), then the training process will degrade the weights of the old semantic classification application features so that they will not hurt classification performance in the new semantic classification application. On the other hand, if the new semantic classification application is very similar to one or more of the old semantic classification applications, then the features of the old semantic classification application can be relied on more so that the usual large set of training data may not be needed for the new semantic classification application because training the soft mapping of knowledge between the old and new semantic classification applications does not require many samples. This makes the implementation of a new semantic classification application such as a call router simpler, faster and cheaper than before.

The earlier work by Karahan used only features that represented the scores from the low-level classifiers, whereas embodiments of the present invention which uses both low-level classifiers (e.g., router scores) together with higher level features such as sentence level information (words, etc.) which are fed together to a high-level semantic classifier. In addition, where Karahan shared classifiers which were trained on subsets of the same tagged training set or with data sets that had the same set of tagged meanings, but embodiments of the present invention are able to use the classification tags from one or more pre-existing semantic classification applications and get a benefit from putting them in the feature extractor of a new semantic classification application even if all the tags sets are different. That is, the classification tags of the different semantic classification applications do not have to be identical so long as there is some relation between them, such as that they are from the same domain.

This technique can be useful in various ways including to create application-specific but company-generic sets of "universal" classification tags within a given domain to create new semantic classification applications. So, for example, a set of "universal telco tags" may be produced so that less training data will be needed to create a new call routing application for a telephone company based pre-existing data for one or more other pre-existing telephone company call routing applications. New call routing applications in new domains will require more data than "within industry" applications within an existing domain.

Figure 5:
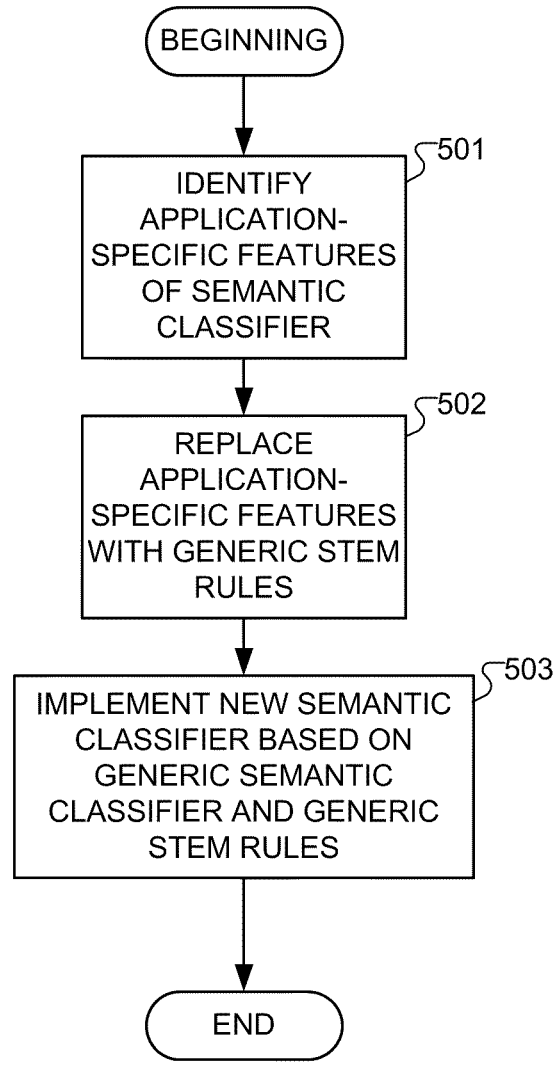
FIG. 5 shows various functional steps in developing a new generic semantic classifier from an old application-specific semantic classifier.

FIG. 5 shows various functional steps in such a process according to one specific embodiment. First, step 501, application-specific features are identified in an application-specific semantic classifier. These are then replaced with a set of corresponding generic stem rules, step 502. The original application-specific semantic classifier is then replaced by a new generic semantic classifier based on the new generic stem rules, step 503.

For example, a pseudo code representation of one specific approach might be set forth as follows:

---

Process ClassificationAbstraction
    identify application-specific features $F_a$ of application-specific
        semantic classifier $C_s$
    replace application-specific features $F_a$ with generic stem rules $R_g$
    replace application-specific semantic classifier $C_s$ with generic
        semantic classifier $C_g$

---

These ideas may be further extended to more generally abstract an existing call routing application for reuse in later new applications. For example, given an existing call routing application trained for a first customer, TelcoA, this can be abstracted and reused for a later new call routing application for another customer in the same domain, TelcoB. A set of stem rules can be implemented to abstract the TelcoA call routing application to replace features such as company trade names with a generic placeholder that abstracts the specific knowledge of the pre-existing TelcoA call routing application. An example stem rule can be used in the feature extractor of the first TelcoA call routing application:

<rule id="CompanyName"><one_of><item>telcoa<\item>item>telcob<\item>

Then, if a user asks for the TelcoA help line, then after feature extraction in the TelcoA call routing application, the feature will become "CompanyName help line". The same features will be extracted in the features extractor of the TelcoA call routing application when training (or testing) the TelcoB call routing application with a requests for "TelcoB help line". This will give further benefit as the correlation between the call routes of TelcoB and TelcoA will be enhanced. The same hold true for other trade names. For example, if TelcoA had a satellite service, ASat, and TelcoB had its own satellite service, BSat, then the stem rule will be something like:

<rule id="SatelliteService"><one_of><item>ASat<\item>item>BSat<\item>

The same idea extends to other company-specific information and for the reuse knowledge from call routing applications from multiple companies.

Embodiments of the invention may be implemented in any conventional computer programming language. For example, preferred embodiments may be implemented in a procedural programming language (e.g. "C") or an object oriented programming language (e.g., "C++", Python). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method for semantic classification comprising:
producing a labeled training corpus by labeling utterances in an unlabeled training corpus of a new semantic classification application using at least two pre-existing semantic classifiers that have been trained for different earlier semantic classification applications, each of the at least two pre-existing semantic classifiers having respective associated pre-existing classification tags that were trained for the different earlier semantic classification applications; and
training a new semantic classifier on the labeled training corpus to produce a set of new classification tags.

2. A method according to claim 1, training the new semantic classifier comprises:
training the new semantic classifier on the labeled training corpus to produce a set of new classification tags for the new semantic classifier including a plurality of the pre-existing classification tags.

3. A method according to claim 2, further comprising:
creating a set of application-specific company-generic classification tags from the set of new classification tags.

4. A method according to claim 1, wherein at least one of the pre-existing semantic classifiers or the new semantic classifier is a statistical classifier.

5. A method according to claim 1, wherein at least one of the earlier semantic classification applications or the new semantic classification application is a call routing application.

6. A method according to claim 1, wherein the new semantic classification application and the earlier semantic classification applications are in different application domains.

7. A method according to claim 1, wherein the new semantic classification application and one of the earlier semantic classification applications are in the same application domain.

8. A method of abstracting a semantic classifier, the method comprising:
   producing a labeled training corpus by labeling utterances in an unlabeled training corpus of a new semantic classification application using at least two pre-existing semantic classifiers that have been trained for different earlier semantic classification applications, each of the at least two pre-existing semantic classifiers having respective associated pre-existing classification tags that were trained for the different earlier semantic classification applications;
   training a first new semantic classifier on the labeled training corpus to produce a set of new classification tags;
   identifying, by a computer system, application-specific features associated with an application-specific semantic classifier in the set of new classification tags;
   replacing the application-specific features with generic stem rules in the set of new classification tags to create application-specific, company-generic classification tags for a new semantic classification application; and
   replacing the application-specific semantic classifier with a generic semantic classifier based on the generic stem rules and the application-specific, company-genetic classification tags.

9. A method according to claim 8, further comprising:
   using the application-specific semantic classifier and the generic stem rules to implement a new application-specific semantic classifier.

10. A method according to claim 9, wherein the semantic classifiers are in different application domains.

11. A method according to claim 9, wherein the semantic classifiers are in the same application domain.

12. A method according to claim 9, wherein the semantic classifiers are statistical classifiers.

13. A method according to claim 8, wherein at least one of the semantic classifiers is a call routing classifier.

14. A computer program product implemented in a non-transitory computer readable storage medium for semantic classification, the product comprising:
   program code for producing a labeled training corpus by labeling utterances in an unlabeled training corpus of a new semantic classification application using at least two pre-existing semantic classifiers that have been trained for different earlier semantic classification applications, each of the at least two pre-existing semantic classifiers having respective associated pre-existing classification tags that were trained for the different earlier semantic classification applications; and
   program code for training a new semantic classifier on the labeled training corpus to produce a set of new classification tags.

15. A product according to claim 14, wherein the program code for training the new semantic classifier comprises:
   program code for training the new semantic classifier on the labeled training corpus to produce a set of new classification tags for the new semantic classifier including a plurality of the pre-existing classification tags.

16. A product according to claim 15, further comprising:
   program code for creating a set of application-specific company-generic classification tags from the set of new classification tags.

17. A product according to claim 14, wherein at least one of the pre-existing semantic classifiers or the new semantic classifier is a statistical classifier.

18. A product according to claim 14, wherein at least one of the earlier semantic classification applications or the new semantic classification application is a call routing application.

19. A product according to claim 14, wherein the new semantic classification application and the earlier semantic classification applications are in different application domains.

20. A product according to claim 14, wherein the new semantic classification application and one of the earlier semantic classification applications are in the same application domain.

21. A system for developing a new semantic classification application based on earlier semantic classification applications, the system comprising:
   means for labeling utterances in an initially unlabeled training corpus of the new semantic classification application using a first pre-existing semantic classifier trained for a first earlier semantic classification application;
   means for labeling utterances in the training corpus of the new semantic classification application using first pre-existing classification tags that are associated with the first pre-existing semantic classifier and that have been trained for the first earlier semantic classification application;
   means for labeling utterances in the training corpus of the new semantic classification application using a second pre-existing semantic classifier trained for a second earlier semantic classification application; and
   means for labeling utterances in the training corpus of the new semantic classification application using second pre-existing classification tags that are associated with the second pre-existing semantic classifier and that have been trained for the second earlier semantic classification application; and
   means for training a new semantic classifier on the training corpus to produce a set of new classification tags.

22. A system according to claim 21, further comprising:
   means for training the new semantic classifier on the training corpus to produce a set of new classification tags for the new semantic classifier including a plurality of the pre-existing classification tags.

23. A system according to claim 22, further comprising:
   means for creating a set of application-specific company-generic classification tags from the set of new classification tags.

24. A system according to claim 21, wherein at least one of the first pre-existing semantic classifier, the second pre-existing semantic classifier, or the new semantic classifier is a statistical classifier.

25. A system according to claim 21, wherein at least one of the first earlier semantic classification application, the second earlier semantic classification application, or the new semantic classification application is a call routing application.

26. A system according to claim 21, wherein the new semantic classification application and at least one of the first earlier semantic classification application or the second earlier semantic classification application are in different application domains.

27. A system according to claim 21, wherein the new semantic classification application and either the first earlier semantic classification application or the second earlier semantic classification application are in the same application domain.

* * * * *